(12) United States Patent
Takahashi et al.

(10) Patent No.: US 7,242,992 B2
(45) Date of Patent: Jul. 10, 2007

(54) PARTS SUPPLY SYSTEM PROBLEM DETECTION SUPPORT SYSTEM AND METHOD, AND PROGRAM FOR THE SAME

(75) Inventors: Tomokazu Takahashi, Aichi-ken (JP); Haruhiko Tsuboi, Aichi-ken (JP); Harumichi Wakiyama, Toyota (JP); Shokichi Yasukawa, Okazaki (JP)

(73) Assignee: Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 74 days.

(21) Appl. No.: 10/510,683

(22) PCT Filed: Jan. 31, 2003

(86) PCT No.: PCT/JP03/00969

§ 371 (c)(1),
(2), (4) Date: May 12, 2005

(87) PCT Pub. No.: WO03/096131

PCT Pub. Date: Nov. 20, 2003

(65) Prior Publication Data

US 2005/0222909 A1 Oct. 6, 2005

(30) Foreign Application Priority Data

Apr. 10, 2002 (JP) .............................. 2002-108346

(51) Int. Cl.
*G06F 19/00* (2006.01)
(52) U.S. Cl. ................... 700/97; 700/222; 707/103
(58) Field of Classification Search .................. 700/97, 700/99, 100, 103, 106, 109, 117, 222; 707/103 R, 707/101, 102; 705/1, 9–10, 7–8, 28–29
See application file for complete search history.

(56) References Cited

U.S. PATENT DOCUMENTS 5,479,343 A    12/1995    Matoba et al.

(Continued)

FOREIGN PATENT DOCUMENTS

EP    0 770 967    5/1997

(Continued)

OTHER PUBLICATIONS

Hajime Aoyama, "Computer & Network Seisan Kanri System no Susumekata," 1st ed., Nippon Jitsugyo Publ. Co., Ltd., 2000, p. 117.

(Continued)

*Primary Examiner*—Kidest Bahta
(74) *Attorney, Agent, or Firm*—Finnegan, Henderson, Farabow, Garrett & Dunner LLP

(57) ABSTRACT

In order to produce high quality final products cheaply using a large-scale production chains, not just the production being performed in the present production unit, but also parts supplies chains must be rational and without waste or overburdening. However, there is presently no means for discovering whether parts supplies chains are irrational, without waste or overburdening, or are rational and without waste or overburdening.

A hierarchical tree table of product-parts lists of multi-stages may be displayed with at least one item of parts supply information, this being selected out of production unit of the parts, number of parts, lead time of the parts, cost of the parts, etc. The retrieved parts supply information is displayed in a manner allowing it to be distinguished from other items of parts supply information. The method of retrieval can be set as desired. The entirety of the parts supplies chains is displayed graphically, and the location where the problems exist becomes clear.

12 Claims, 10 Drawing Sheets

U.S. PATENT DOCUMENTS

| | | | |
|---|---|---|---|
| 5,970,465 | A | 10/1999 | Dietrich et al. |
| 6,438,436 | B1* | 8/2002 | Hohkibara et al. ........... 700/97 |
| 2003/0229550 | A1* | 12/2003 | DiPrima et al. .............. 705/28 |
| 2004/0103015 | A1* | 5/2004 | Schaffrath et al. ............. 705/8 |

FOREIGN PATENT DOCUMENTS

| | | |
|---|---|---|
| JP | H09-267239 | 10/1997 |
| JP | 2000-276526 | 10/2000 |
| JP | 2001-331535 | 11/2001 |

OTHER PUBLICATIONS

Tomofumi Kimura, "[Seiwa Denki] Seisan Kanri System to PDM ga Joho Kokan," Nikkei Digital Engineering, Nikkei Business Publications, Inc., No. 4, 1998, pp. 68-72.

Tohmatsu Consulting Group, "Seissan-Zaiko Kanri System no Sekkei," 1st ed., Chuokeizai-sha, Inc., 1998, pp. 29-33.

Masaru Yoshida, "[Kikuchi press Kogyo] Chuken Kigyo muki Seihin Joho Kanri System no Sugata Simesu," Nikkei Digital Engineering, Nikkei Business Publications, Inc., No. 8, 1998, p. 60.

International Search Report dated Mar. 18, 2003 attached to PCT Publication WO 03/096131 A1.

* cited by examiner

FIG. 4

| Product | Parts | | Production Unit (Linking Destination) | | Number of Parts | | Number of Types | | | Logistics Information | Distance of Traveling | Defect Rate | Cost | Lead Time |
|---|---|---|---|---|---|---|---|---|---|---|---|---|---|---|
| | | | | | | | Attribute of Part | | | | | | | |
| | | | 401 | (N) 403 (C) | 401 (C) | | (s) | (c) | (g) 403 (C) | 401 403 (C) (i) | 401 403 (C) (200) | 401 403 (C) (5) | 401 403 (C) (1000) | 401 403 (C) (5) |
| A | B1 | | Okazaki 2Aa | 2 A | 4 | B | 2 | | C | Inventory | | F | G | H |
| | B1 | | Okazaki 3Bb | | 4 | B | 2 | | C | Trading Company D | | | | H |
| | ........... | | | | | | | | | | | | | |
| | C1 | | | | | | | | | | | | | |
| | C1 | | | | | | | | | | | | | |
| | D1 | | | | | | | | | | | | | |
| | D1 | | | | | | | | | | | | | |
| | E1 | | | | | | | | | | | | | |

(N) : Number of Duplication  
(C) : Countermeasure  
A : Aggregation  
B : Integrate  
C : Use Common Part or General Purpose Part (s) : Special Purpose  
(c) : Common  
(g) : General Purpose  
(i) : Inventory FIG. 8
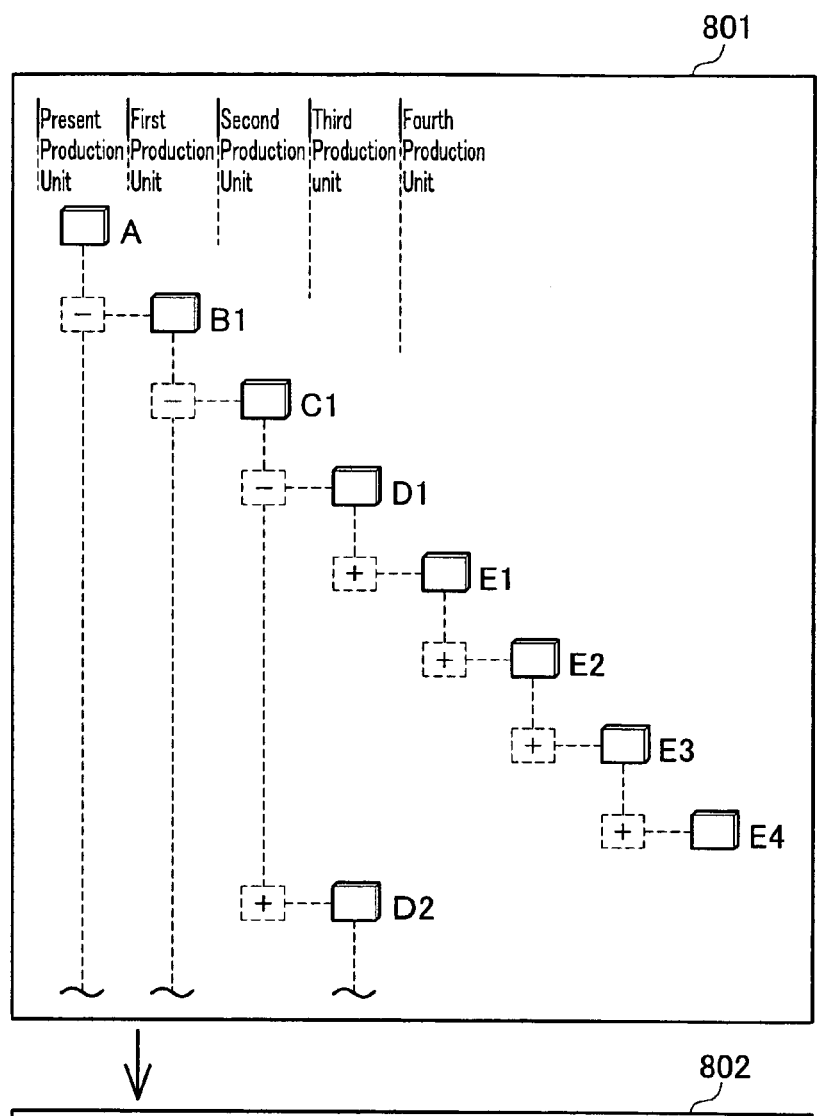
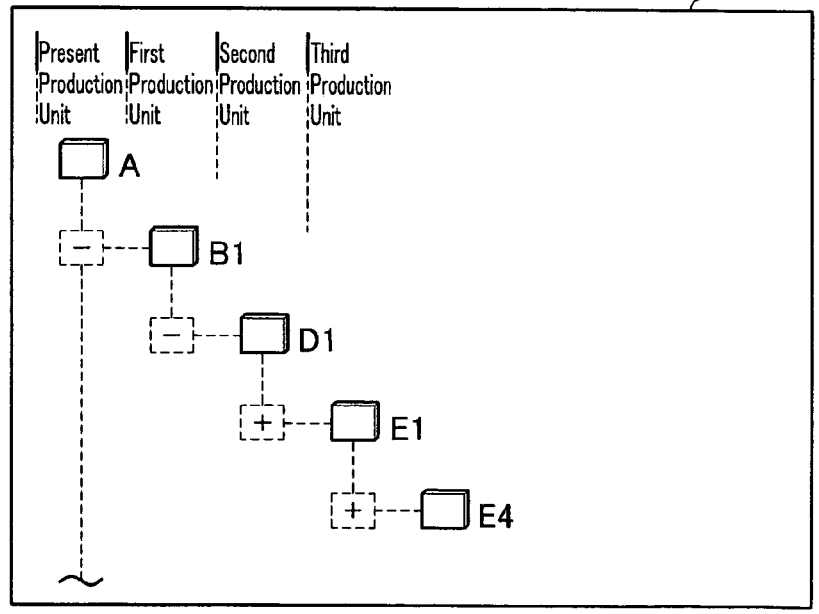

PARTS SUPPLY SYSTEM PROBLEM DETECTION SUPPORT SYSTEM AND METHOD, AND PROGRAM FOR THE SAME

TECHNICAL FIELD

The present invention relates to a technique for managing a production chains. In the production chains, a production activity such as parts produced in a production unit are used in a subsequent production unit to produce high level parts and a subsequent production activity such as the high level parts produced in the subsequent production unit are used in a more subsequent production unit to produce even higher level parts are repeated at multi-stages. The chains of production activities are repeated in sequence to produce final products at the end. The present invention relates to a technique for managing the production chains so that the final products with high quality can be produced at a low cost within a short time.

BACKGROUND ART

In producing, for example, a car, coils are produced in a production unit, the coils are used in a subsequent production unit to produce armatures, the armatures are used in a subsequent production unit to produce motors, the motors are used in a subsequent production unit to produce fuel pumps, the fuel pumps are used in a subsequent production unit to produce fuel pump assemblies, the fuel pump assemblies are used in a subsequent production unit to produce fuel tank assemblies, and the fuel tank assemblies are used in a subsequent production unit to produce cars. A production activity such as parts produced in a former production unit are used in a subsequent production unit to produce high level parts is repeated many times or multi-stages in a normal production chains.

In the present specification, a production unit is numbered from the highest side, and a production unit that produces final product is termed the present production unit. In the example given above, the coils are produced in a sixth production unit, the armatures in a fifth production unit, the motors in a fourth production unit, the fuel pumps in a third production unit, the fuel pump assemblies in a second production unit, and the fuel tank assemblies in a first production unit. The fuel tank assemblies produced in the first production unit are delivered to the present production unit, and the final products (the cars) are produced in the present production unit.

The aforementioned 'first production unit' could instead be considered as 'the present production unit' in a case that the fuel tank assemblies are produced as final products. In this case, the 'second production unit' described earlier is now the 'first production unit' and the 'third production unit' is now the 'second production unit'. Any production unit that receives lower parts and produces higher parts by using lower parts can be deemed to be the 'present production unit', and the production units preceding it may be termed the 'first production unit', 'second production unit', 'third production unit', etc. The technique of the present invention assists findings of problems by revealing problems existing but concealed within parts supplies chains that supply parts to the present production unit. The technique of the present can be applied to any production unit in which lower level parts are used to produce higher level parts.

To produce high quality final products at a low cost within a short time in a production chains, parts supplies chains for the production chains must be rational. Waste or overburdening should be excluded from the parts supplies chains for the production chains. For example, in each production unit within the parts supplies chains, the rate of defective parts should be low, the number of inventoried parts should be less, production and delivery should take place within a short time, and the number of part suppliers should be reduced to an appropriate number.

However, under present circumstances there is no means for learning whether parts supplies chains are irrational with waste or overburdening, or are rational without waste or overburdening. Japanese Patent Laid Open Publication 2001-331535 and Japanese Patent Laid Open Publication H9-267239 set forth a technique for graphically displaying an overall relation of various parts defined by a product—first level parts list, first level part—second level parts list, second level part—third level parts list and so on. The overall relation defined by the upper level part—lower level parts list at multi-stages is graphically displayed by using linking information defining hierarchic relationship. When a higher level part is designated, it is possible to identify chains of lists of lower level parts at various levels that constitute the higher level part.

Even though the lists of the lower level parts at various levels that constitute the higher level part is shown graphically, it is not possible to know from this graphic display whether the parts supplies chains are irrational with waste or overburdening, or are rational without waste or overburdening.

DISCLOSURE OF INVENTION

The present invention teaches a technique for revealing problems (waste or overburdening) existing and concealed in parts supplies chains including a variety of production units. The present technique further makes it possible to take an appropriate countermeasure for solving the found problem. It thus allows high quality final products to be produced at a low cost within a short period. Further, the present technique may reveal a part production unit having superior ability that produces high quality parts at a low cost within short period. It thus allows evaluating the production units reasonably.

In the present invention, a system that reveals problems existing but concealed in parts supplies chains and assists in finding and recognizing the in the parts supplies chains has been created.

This system is used to analyze a production chains in which a production activity such as parts produced in a former production unit are used in a subsequent production unit to produce high level parts and a subsequent production activity such as the high level parts produced in the subsequent production unit are used in a more subsequent production unit to produce even higher level parts are repeated at multi-stages. The final products are produced in the present production unit by using final parts (first level parts) that were produced in final parts production unit (first production unit).

The final products referred to here are not limited to final products from the viewpoint of a consumer. As in the example given earlier, the fuel tank assemblies could be also final products when considered from the viewpoint of the production unit to produce the fuel tank assemblies. If the final products are the fuel tank assemblies, then the production unit of the fuel tank assemblies becomes the present production unit, and the fuel pump assemblies becomes first parts. FIG. 1 shows an example of a production chains in which motors are produced in a fourth production unit, fuel pumps are produced in a third production unit, fuel pump assemblies are produced in a second production unit, the fuel tank assemblies are produced in a first production unit, and cars are produced in a present production unit. If one considers the production unit for producing the fuel tanks assemblies to be the present production unit, the second production unit described earlier could now be termed the first production unit, and the third production unit could now be termed the second production unit. Any production unit in which production is performed by using lower level parts supplied from previous production units can be deemed to be the present production unit. Consequently the present system can be applied to any production unit that uses lower level parts supplied from previous production units.

This system reveals problems (waste or overburdening) existing and concealed in parts supplies chains for supplying final parts (first level parts) to the present production unit and assists in grasping the problems. The system analyzes the parts supplies chains including the first production unit and the production units upstream therefrom.

The system of the present teaching comprises the following means:

(1) A means for storing a product-parts lists of multi-stages and parts supplies information The product-parts lists of multi-stages includes a list of adjoining lower level parts constituting the final product (a list of first parts), a list of even lower level parts constituting the lower level parts (a list of second parts constituting each first part, a list of third parts constituting each second part, etc.) and linking information of the lists. Overall lists are formed from chains of lists at multiple stages. The parts supplies information is related to the first and lower level parts for the final products and includes at least one item selected out of the production unit of the part, the number of the parts required to produce a higher level part, the attribute of the part, the number of types of the part, the logistics information of the part, the distance of traveling of the part, the defect rate during the production of the part, the cost of the part, and the lead time of the part.

In FIG. 1, an example is shown in which the present production unit produces the final product 'A'. A list of first level parts constituting the final product 'A' is shown to the right of the final product 'A', a list of second level parts constituting each first level part is shown to the right of each first level part, a list of third level parts constituting each second level part is shown to the right of each second part, and a list of fourth level parts constituting each third level part is shown to the right of each third level part. In the example shown in FIG. 1, the first level part B1 is required to produce the final product 'A', the second level parts C1 and C2 are required to produce the first level part B1, the third level parts D1 and D2 are required to produce the second level part C1, and the fourth level parts E1, E2, E3, and E4 are required to produce the third level part D1.

(2) A means for graphically displaying the product-parts relations stored in the storing means (1) and the parts supplies information corresponding to each of the parts stored in the storing means (1).

(3) A means for retrieving, according to prescribed retrieving criteria, the parts supplies information corresponding to each of the parts.

(4) A means for displaying the parts and/or the parts supplies information corresponding to the parts, these (this) having been retrieved by the retrieval means, in the graphic display to be distinguished from the others.

The schematic example of FIG. 1 shows that parts supplies information b1 is displayed corresponding to the first part B1. Further, parts supplies information c1 is displayed corresponding to the second level part C1, and parts supplies information c2 is displayed corresponding to the second level part C2. The part supplies information b1, c1, and c2 each comprises at least one item of the parts supply information of the parts B1, C1, and C2. Specifically, at least one item of information is selected out of the production unit for the part (there may also be a plurality of production units), the number of parts required to produce a higher level part, the attribute of the part (distinguishing whether the part is, for example, a special purpose part or a general purpose part), the number of types of the part, logistics information of the part (distinguishing whether the part is, for example, delivered from inventory or directly from a production unit, and whether the part is delivered via a trading company or is delivered directly from a production unit), the distance of traveling of the part, the defect rate during the production of the part, the cost of the part, and the lead time of the part. One, or two or more items of information can be selected.

The retrieving criteria can be set in various ways. It is possible to retrieve: parts of which a number of production units is equal to or exceeds a prescribed number, parts of which number is equal to or exceeds a prescribed number to produce a higher level part, parts of which number of types is equal to or exceeds a prescribed number, parts having prescribed distribution conditions, parts of which distance of traveling exceeds a prescribed distance, parts of which defect rate exceeds a prescribed rate, parts of which cost is equal to or exceeds a prescribed cost, parts of which lead time is equal to or exceeds a prescribed lead time, etc. The retrieving criteria may be set in advance, or may be set as required.

As shown schematically in FIG. 1, the entirety of the parts supplies chains can be visualized by graphically displaying product-parts relations at multi-stages and the parts supplies information corresponding to each of the parts. The entirety of the parts supplies chains may be understood visually.

When the graphic display shows the parts and/or the parts supply information corresponding to each of the parts, which have (has) been retrieved according to the prescribed retrieving criteria, to be distinguished from the others, problems in the parts supplies chains are revealed or visualized (for example, if there is a higher level part having a large number of adjoining lower level parts, that higher level part will be distinguished from the other; if there is a part which have a long lead time, that part will be distinguished from the other; if there is a part which has an extremely high price, that expensive part will be distinguished from the other). The findings or recognition of problems that exist but concealed in the parts supplies chains are thus effectively assisted or supported.

The quantity of information shown schematically in FIG. 1 is extensive, and is not easy to prepare or collect. However, from the present production unit, it is rather easy to collect the part supplies information of the first level part produced in the first production unit, such as the production unit for the part, the number of parts required to produce a higher level part, the attribute of the part the number of types of the part, logistics information of the part, the distance of traveling of the part, the defect rate of the part, the cost of the part, and the lead time of the part. However, it is very troublesome to collect parts supplies information from the second production units, the third units and so on.

To deal with this, it is preferred that a plurality of storing means are connected by a network into one united storing means: this storing means stores product-parts lists at multi-stages, and the parts supplies information corresponding to each of the parts included in the product-parts lists at multi-stages.

If this is done, each storing means may be managed by each of production units. Each storing means may store upper level part-lower level parts list at single stage. Further, each storing means stores the parts supplies information corresponding to each of lower level parts. Moreover, each storing means stores the linking information; this linking information designates the storing means prepared by lower level production units which supply the lower level parts.

In the case shown in FIG. 1, the storing means 103 of the first production unit stores the data that the second parts constituting the first part B1 are C1 and C2. The storing means 105 of the second production unit stores the data that the third parts constituting the second part C1 are D1 and D2. Another storing means of the second production unit stores the data that the third part constituting the second part C2 is D3. The storing means 107 of the third production unit stores the data that the fourth parts constituting the third part D1 are E1, E2, E3 and E4. Another storing means of the third production unit stores the data that the fourth parts constituting the third part D2 are E5, E6, E7, and E8. Furthermore, the storing means 103 of the first production unit stores the linking information to a storing means 105 of the second production unit, which stores the second part C1 as a part that is produced in the second production unit. The storing means 105 of the second production unit stores the linking information to a storing means 107 of the third production unit, which stores the third part D1 as a part that is produced in the third production unit.

Connecting a plurality of storing means by a network makes it possible to prepare the huge-scale data base having multi-stages. Each storing means may store only single-stage data base. Each data base of single-stage may be prepared within a short time. Connecting the plurality of storing means, each storing means storing single-stage data base, makes it possible to prepare the huge-scale data base having multi-stages within a short time. The huge-scale data base having multi-stages stores product-parts lists at multi-stages and the parts supplies information of each of the parts. The huge-scale data base having the extensive quantity of information that constitutes the entirety of the parts supplies information for the large-scale production chains may be prepared within a short time.

Although the retrieving criteria can be set in various ways, it is preferred to use reference values as the retrieving criteria. Further, it is preferred to add a means for displaying a list of standard countermeasures. When retrieved items have failed to fulfill the reference values, standard countermeasures that will allow the reference values to be satisfied will be indicated in addition to the problem.

For example, when the number of lower level parts constituting a high level part has been stored as a portion of parts supplies information, it is possible to retrieve the high level part of which number of lower level parts is equal to or greater than the prescribed number. Thus one can extract the high level part requiring a large number of lower level parts. If this is done, the standard countermeasures are displayed to reduce the number of required low level parts, such as integrating the low level parts, redesigning of the high level part. That is, the presence of a problem and its countermeasures are displayed. Problems in the parts supplies chains should thus be improved speedily.

It is preferred that each of the lower level parts is displayed graphically on product-parts lists of multi-stages with its production unit.

If this is done, it becomes apparent whether parts supplies chains for an identical part are overlapping or not, or whether a particular production unit has many problems with the parts supply. It becomes consequently easy to take the necessary countermeasures. Alternatively, outstanding or superior production units become apparent and superior production units are given opportunities of their outstanding abilities being evaluated accurately. It also becomes easy for a production unit that needs a lower level parts supplier to find a superior production unit having outstanding ability to supply the lower level parts. It becomes easy to establish parts supplies chains that supply parts in sequence at a low cost and within a short time.

It is preferred that each of the lower level parts is displayed graphically on the product-parts lists of multi-stages with the number of parts required to produce a higher level part.

If this is done, a part that requires a large number of the lower level parts can be identified, and it is easy to detect the part of which lower level parts require integration or to be assembled into one part.

It is preferred that each of the constituting parts is displayed graphically on the product-parts lists of multi-stages with its attribute.

Here, the term 'attribute of the part' refers to whether the part is a special purpose part used only in one type of final products, a common part used commonly in various types of final products, or a general purpose parts that circulate normally in the market.

Cost and lead time can be reduced by using common parts and general purpose parts instead of special purpose parts. The above display allows the current situation to be understood easily from this viewpoint.

It is preferred that each of the constituting parts is displayed graphically on the product-parts lists of multi-stages with its number of types.

If this is done, parts having a large number of types can be identified, and it is easy to detect parts which need be redesigned to be replaced by common parts or parts in series.

It is preferred that each of the parts is displayed graphically on the product-parts lists of multi-stages with its logistics information from the production unit of the part to a subsequent production unit.

Here, 'logistics information' refers to information indicating whether the part is delivered from inventory, for example, or delivered via a trading company, or others. Distribution cost can be included as required.

When the logistics information is displayed, waste or overburdening relating to delivery conditions is made visible, and problems are thus detected.

It is preferred that each of the parts is displayed graphically on the product-parts lists of multi-stages with its distance of traveling from the production unit of the part to a subsequent production unit.

When the distance of traveling required for delivery of the part is displayed, problems relating to the geographical location of the part production units are made visible, and problems are thus detected.

It is preferred that each of the parts is displayed graphically on the product-parts lists of multi-stages with the defect rate during the production of the parts.

When the probability (percentage) of defective parts during the production is displayed, production units which have problems are detected, and countermeasures to improve quality therein can be taken.

It is preferred that each of the parts is displayed graphically on the product-parts lists of multi-stages with its cost.

If this is done, parts of which cost should be reduced become apparent, and the information to analyze the reason of the high cost is displayed. It thus becomes easy to take effective countermeasures to reduce the cost.

It is preferred that each of the parts is displayed graphically on the product-parts lists of multi-stages with its lead time.

If this is done, parts of which lead times need to be shortened become apparent and the information to analyze the causes of the long lead time is displayed. It thus becomes easy to take effective countermeasures to shorten the lead time.

It is further preferred that, for each of the parts, each of lead times divided into each step from ordering until delivery are displayed.

The total lead time can be divided into, for example, the time from ordering until the beginning of production, the time from the beginning of production to the completion of production, the inventory time in which the parts are stored from the completion of production until shipping, and transport time from shipping until delivery. If each of lead times of each of steps is displayed separately, it becomes easy to take effective countermeasures to shorten the total lead time. Further, the separation of lead times into multi-steps is not limited to the example described above.

It is further preferred that the total lead time of each of the parts is displayed with each of lead times of each of production units from the lowest level part to adjoining low level part, these constituting one part.

If, for example, it is displayed that the lead time is 0.5 day for the fourth part, is 0.5 day for the third part, is 0.5 day for the second part, and thus is 1.5 days for the first part, the total of the lead time becomes apparent.

It is preferred that for each of the low level parts graphically shown on the product-parts lists of multi-stages, at least one item selected out of the number of parts required to produce a higher level part, the attributes of the part, and the number of types of part, as well as the cost of the part and the lead time of the part are displayed in a manner of comparison.

If this is done, technical information relating to the part configuration, cost information, and lead time information are displayed in a manner of comparison. Consequently, it becomes possible to comprehensively grasp the parts supplies chains from the aspects of technique, production, and distribution, and it becomes easy to take comprehensive countermeasures.

Moreover, required items other than the aforementioned items can also be displayed.

In the present invention, a method has been created that reveals problems existing but concealed in parts supplies chains and thus makes it easy to find these problems. The following steps are executed in the method of the present teaching:

(1) A step for each of production units to prepare a database. Each of production units prepares a list of adjoining lower level parts required for producing the part in the production unit. That is, the each production unit prepares product-parts list at single-stage. The product corresponds to the part produced in the production unit. Further, each production unit prepares parts supplies information corresponding to each of the adjoining lower level parts, the parts supplies information being at least one item selected out of the production unit of the part, the number of parts required to produce a higher level part, the attribute of the part, the number of types of part, the logistics information of the part, the distance of traveling of the part, the defect rate during the production of the part, the cost of the part, and the lead time of the part.

(2) A step for each of production units to prepare linking information. The linking information connects the data base prepared by the production unit to lower level databases prepared by lower level production units. The connected lower level database stores product-parts list, in which the 'product' is one of the adjoining lower level parts within the higher level database prepared the higher level production unit.

(3) A step of graphically displaying product-parts lists of multi-stages. The product-parts lists of multi-stages includes final product-first parts list, first part-second parts list and so on. Product-parts lists of multi-stages are assembled from each product-parts list of single-stage and linking information prepared by each of production units. Parts supplies information corresponding to each of the parts is also displayed.

In the present method, each of production units prepares product-parts list of a single-stage. The product in the list corresponds to the part produced in the production unit. Parts in the list correspond to adjoining lower level parts required for producing the product in the list. Further, each of production units prepares at least one item of parts supplies information corresponding to each of the adjoining lower level parts. At this juncture, it is sufficient to merely investigate the adjoining lower level part production units and parts, and the investigation needs not be followed back further. Consequently, a reliable database is completed relatively easily.

Each of production units prepares liking information for connecting its database to lower level databases prepared by lower level production units. The connected lower level database stores product-parts list, in which the 'product' is one of the adjoining lower level parts within the upper level database prepared the upper level production unit. Consequently, these databases, which are prepared independently, form one united large-scale database indicating the product-parts lists of multi-stages. The product-parts lists of multi-stages include final product—first parts list, first part—second parts list and so on, and the lists are connected with hierarchy. The united large-scale database also includes parts supplies information corresponding to each of the parts included in the product-parts lists of multi-stages.

In the case of FIG. 1, the database 103 of the first production unit stores the data that the second parts that constitute the first part B1 are C1 and C2. The database 105 of the second production unit stores the data that the third parts that constitute the second part C1 are D1 and D2. The database 107 of the third production unit stores the data that the fourth parts that constitute the third part D1 are E1, E2, E3, and E4. Furthermore, the database 103 of the first production unit stores the linking information to the database 105 of the second production unit, this storing the second part C1 as a part that is produced. The database 105 of the second production unit stores the linking information to the database 107 of the third production unit, this storing the third part D1 as a part that is produced.

The following program is useful to complete the aforementioned database, in which the plurality of independent databases is linked to construct one united large-scale database The program of the present invention operates a computer that is managed by each of production units so as to execute the following steps:

(1) A step for assisting an operator to input a product-parts list into the computer. The product in the list corresponds to the part produced in the production unit. Parts in the list correspond to adjoining lower level parts required for producing the product in the list.

(2) A step for assisting an operator to input parts supplies information corresponding to each of the lower level parts in the list to the computer. The parts supplies information is at least one item selected out of: the production unit of the part, the number of parts required, the attribute of the part, the number of types of part, the logistics information of the part, the distance of traveling of the par, the defect rate during the production of the parts, the cost of the part, and the lead time of the part.

(3) A step for assisting an operator to input linking information to the computer. The linking information designates databases prepared by lower level production units for producing adjoining lower level parts.

If this program is used in each of production units and each database is constructed in accordance with the program, it is possible, merely by inputting data concerning the adjoining lower level parts, to complete one united database which stores the entirety of large-scale parts supplies chains, these chains are linked at multiple stages. Moreover, the database does not necessarily need to be completed without any gaps. The database still functions when a portion of the data has not been obtained.

The method of the present invention can be considered as a method for revealing advantages and disadvantages concealed within the parts supplies chains that are formed from a sequence of production units from the lowest level parts production units up to final parts production unit. In this method, the following steps are executed:

(1) At each of production units in the parts supplies chains;
(1a) a step of preparing product-parts list. The product in the list corresponds to the part produced in the production unit. Parts in the list correspond to adjoining lower level parts required for producing the product in the list.
(1b) a step of preparing parts supplies information. The parts supplies information is at least one item selected out of: number of lower level parts required to produce the upper level part, attribute of the lower level part, and number of types of the lower level part.
(1c) a step of preparing another parts supplies information. The parts supplies information is at least one item selected out of: lead time and cost of the adjoining lower level part required, and
(2) a step of preparing linking information to a database that has been prepared by the production unit producing the adjoining lower level parts.

Here, the method is characterized in that each database has a common format.

There are various production units for various parts. There are production units that chiefly utilize chemical reactions, production units focusing on machine work, production units focusing on assembly, production units focusing on heat treatment or others. Each of every production units pays extreme efforts to overcome waste or overburdening in each production unit. For example, it collects and analyzes numerical information relating to productivity. Since the production units have varying characters, every production unit is quantized to suit its circumstances. For example, in production units focusing on chemical reactions, productivity is evaluated by the lot units that react at one time. However, when the entirety of the parts supplies chains is analyzed, the data cannot be synthesized due to the variety of production units.

In the present invention it has been ascertained that, even in various production units with differing conditions, it is possible to analyze cost, lead time and others by part basis on a hierarchical product-parts lists of multi-stages, and it is possible to utilize a common format. Further, it has been ascertained that, by utilizing the common format, it is possible to obtain one united database describing the entirety of the parts supplies chains.

A hitherto unobtainable database describing the entirety of the parts supplies chains is obtained by means of the present method. Analysis of the database reveals advantages and disadvantages within the parts supplies chains.

The present invention can be readily understood by reading the description of embodiment described below, with reference to the figures.

BRIEF DESCRIPTION OF DRAWINGS

FIG. 4 shows a sample of a display on a user interface indicating product-parts lists of multi-stages stored in the parts supplies chains database, reference values, and lists of countermeasures.

FIG. 8 shows a sample of a display in which parts supply information before and after the standard countermeasure is taken.

BEST MODE FOR CARRYING OUT THE INVENTION

Figure 1:
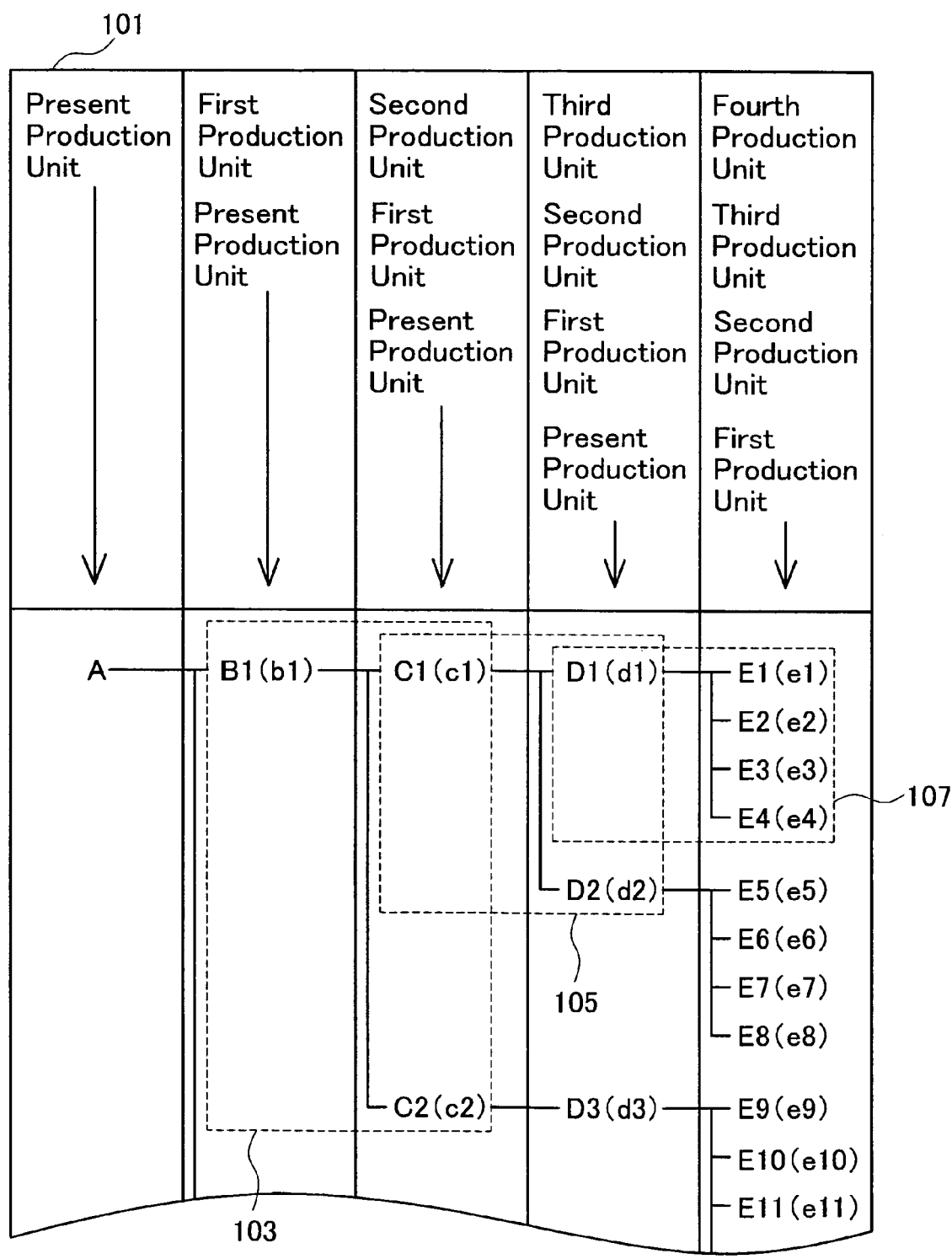
FIG. 1 shows a schematic figure of a hierarchical tree structures of united product-parts lists of multi-stages.
Figure 2A:
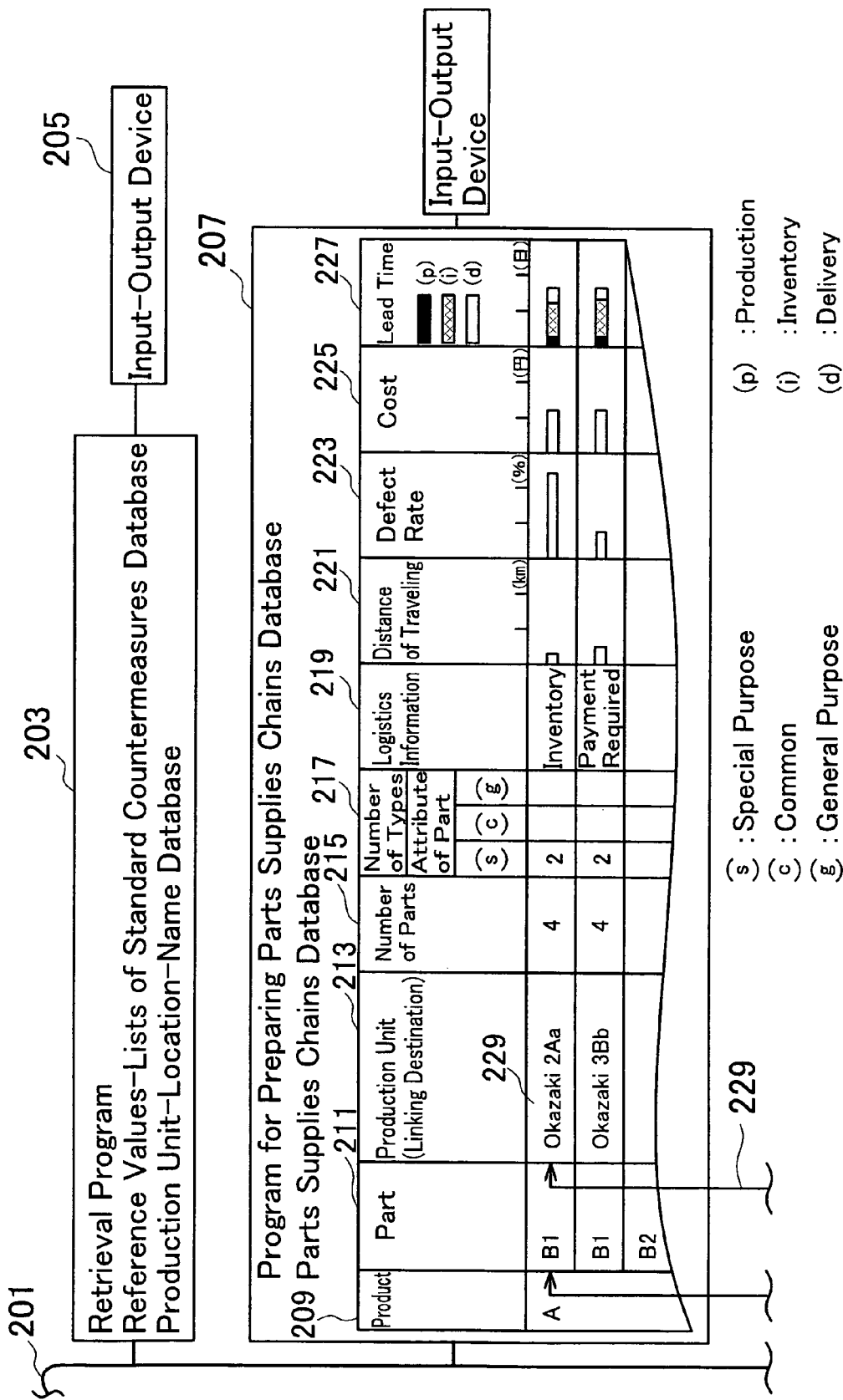
FIG. 2A shows an example block diagram of a system for revealing problems and assisting findings of the problems existing and concealed in parts supplies chains.
Figure 2B:
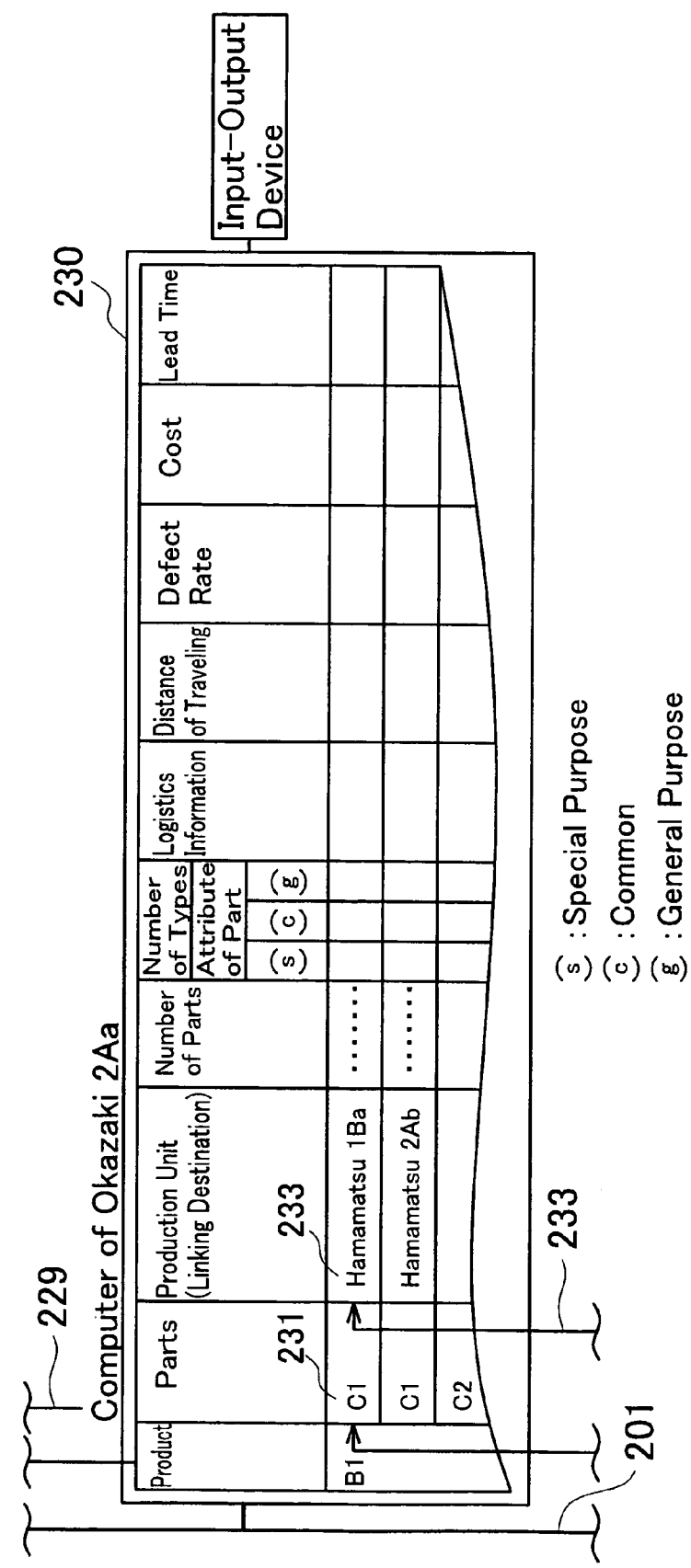
FIG. 2B shows an example block diagram of a system for revealing problems and assisting findings of the problems existing and concealed in parts supplies chains.
Figure 2C:
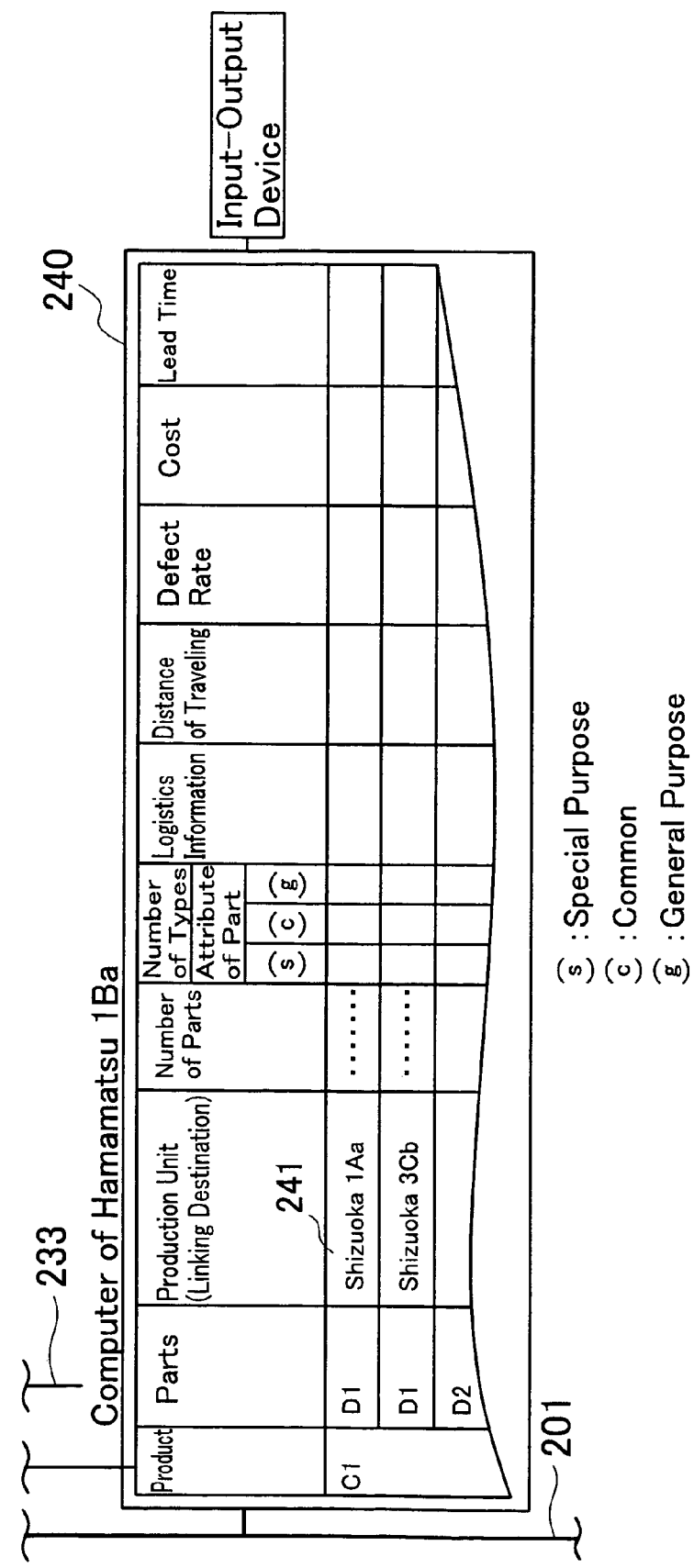
FIG. 2C shows an example block diagram of a system for revealing problems and assisting findings of the problems existing and concealed in parts supplies chains.

Next, an example of an embodiment of the present invention will be described. FIGS. 2A, 2B, and 2C show example of a system for revealing problems and assisting human beings to find and recognize the problems existing and concealed in parts supplies chains.

As shown in FIGS. 2A, 2B, and 2C, a computer 203 for analyzing parts supplies chains, a computer 207 managed by a present production unit, a computer 230 managed by a first production unit, and a computer 240 managed by a second production unit, are each connected with a network 201. Not all the computers are shown. There is a plurality of first production units, and a plurality of computers is used therefore. There is also a plurality of second production units, and a plurality of computers is used therefore. Computers used for production units at lower levels than the third production unit are also connected with the network 201. An input-output device is connected with each computer.

As shown in FIG. 2A, the computer 203 for analyzing parts supplies chains comprises: a retrieval program for retrieving parts supplies information stored with respect to each part of product-parts lists of multi-stages; a database that stores reference values and lists of standard countermeasures for enabling those reference values; and a database that stores the location and name of each of the production units. It further comprises a program for preparing and outputting data tables concerning the parts supplies chains (to be described).

As shown in FIG. 2A, computer 207 of the present production unit contains: a program for preparing a parts supplies chains database, and the parts supplies chains database. The parts supplies chains database stores a product-parts lists of single-stage that describes relations between a final product and parts (first level parts) constituting the final product, and the parts supply information relating to each of the first level parts.

As shown in FIGS. 2B and 2C, the computers 230 and 240 managed by the lower production unit respectively stores a product-parts lists of single-stage that describes relations between a product and parts constituting the product, and the parts supply information relating to each of the lower level parts. The one of lower parts in the computer 207 is the product in the computer 230, and the one of lower parts in the computer 230 is the product in the computer 240.

As shown in FIGS. 2A, 2B, and 2C, the computer 207 of the present production unit, the computer 230 of the first production unit and the computer 240 of the second production unit, and others are linked together via the network 201 to form one united large-scale database.

Figure 3:
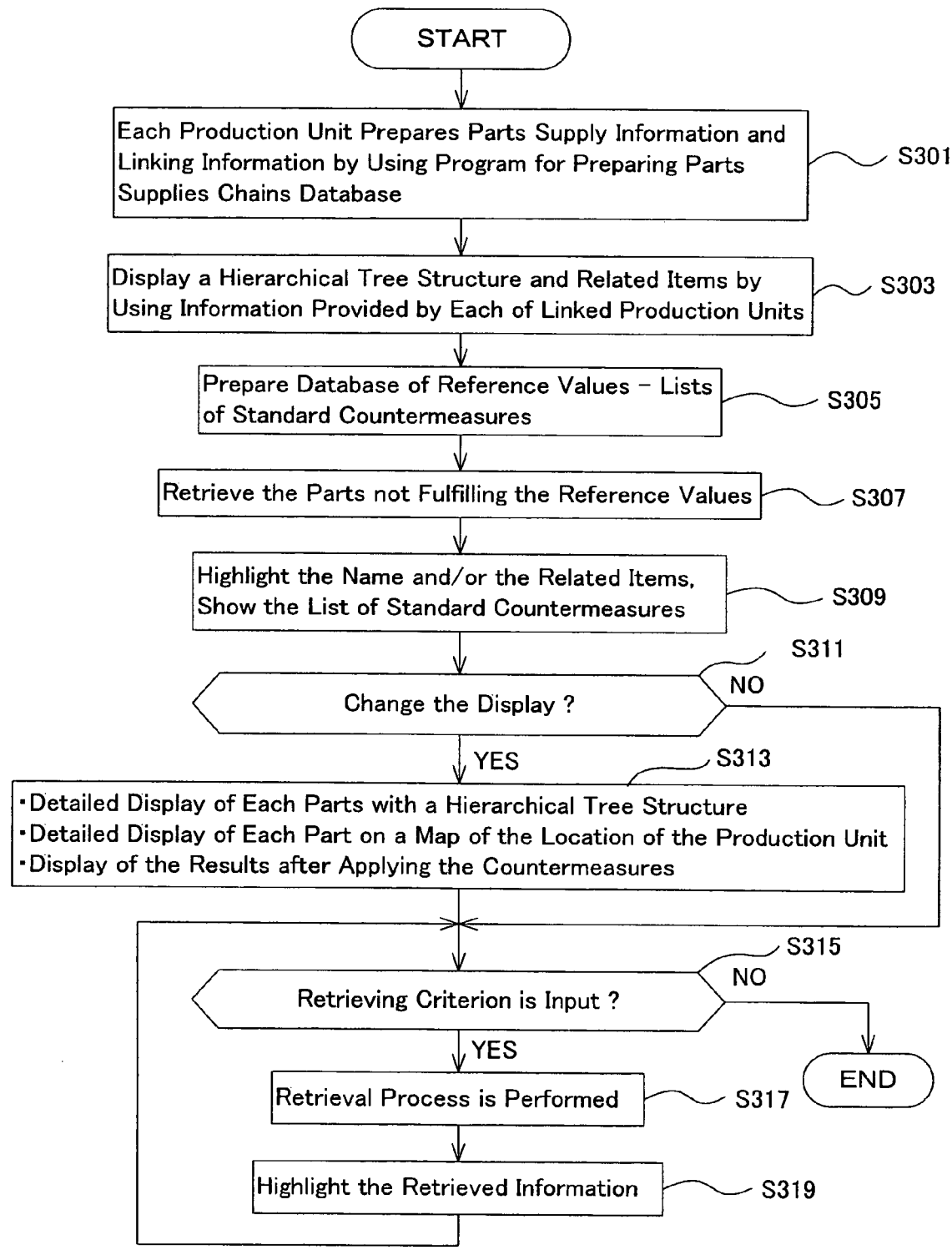
FIG. 3 shows a flowchart showing sequences of steps for preparing and using parts supplies chains database.

FIG. 3 shows an entirety of a procedure, from a step in which a parts supplies chains database is organized (to be described) until problems are revealed.

As shown in step S301 of FIG. 3, each of production units prepares each parts supplies information and linking information to lower level database by using the program for preparing the parts supplies chains database and corresponding computers 207, 230 and 240.

Specifically, as reference 207 of FIG. 2A, 230 of FIG. 2B, and 240 of FIG. 2C shows, each of production units prepares product-parts list. The product in the list means the product produced in the production unit (for the present production unit, the product means the final product). The parts in the list mean the adjoining lower level parts that constitute the product in the list. Using the program allows these items of information to be set up as a formalized standard format.

FIGS. 2A, 2B, and 2C show an example of one database that has been prepared. Each database is prepared by the computers 207, 230 and 240 and others managed by each production unit respectively.

As shown in FIG. 2A, the final products produced in the present production unit is shown at a product section 209 of the database stored in the computer 207 managed by the present production unit. The product has been represented by the term 'A', but may be represented by a product number or the like. Further, the parts produced in each production unit following a first production unit are represented as products in the database.

The adjoining lower level parts constituting the product shown in the product section 209 are shown in parts section 211. In FIG. 2A, the parts B1 and B2 that constitute the final product A are represented. As shown in FIG. 2B, the computer 230 of the first production unit stores the data that the first part B1 is produced using second parts C1 and C2, and as shown in FIG. 2C, the computer 240 of the second production unit stores the data that the second part C1 is produced using third parts D1 and D2.

Production units for producing the adjoining lower level parts are displayed in a production unit section 213. In FIG. 2A, the location and name of the production units for producing the lower level parts are shown. Specifically, the example shows that the lower level parts B1 are produced both in Okazaki 2Aa and Okazaki 3Bb. Okazaki 2Aa means a production unit 'a' of line 'A' of factory '2' in Okazaki'; and Okazaki 3Bb means a production unit 'b' of line 'B' of factory '3' in Okazaki'.

The number of parts is displayed as a figure in a number of parts section 215. 'Number of parts' refers to the total number of adjoining lower level parts used for manufacturing one product (in the production units below the first production unit, product corresponds to part).

The number of types and attribute of the part are shown in a number of types of part, attribute of the part section 217. The 'number of types' displays, by means of a number, how many version of the same part is being manufactured. Furthermore, 'attribute of the part' refers to a classification of the part into special purpose part, common part, and general purpose part. Since there are two versions of the part B1, the number '2' is shown in FIG. 2A Further, since B1 is a special purpose part, the number '2' is shown in the 'special purpose part' column of the attribute of the part.

Information concerning the logistics of the part from the production unit to the upper production unit is stored in a logistics information section 219. In this section, 'inventory' is displayed if the part is delivered from inventory, 'trading company' is displayed if the part is delivered via a trading company, and 'payment required' is displayed if payment is required for the services of delivering the part.

In a distance of traveling section 221, the distance over which part moves from its production unit to the subsequent production unit is indicated. The distance is represented by a bar that extends in a horizontal direction that corresponds with distance. For the first part B1, for example, a distance from the 'Production unit of line A of factory 2 in Okazaki' to the present production unit is displayed.

In a defect-rate section 223, the probability of defective parts being produced is represented by a bar that extends in a horizontal direction. The length of the bar corresponds to a percentage of defective parts.

In a cost section 225, the cost of each part is represented by a bar that extends in a horizontal direction. The length of the bar corresponds to the cost of each part.

In a lead time section 227, the lead time required from ordering until delivery of the part is represented by a bar that extends in a horizontal direction. The length of the bar corresponds to the length of the lead time. The lead time can be displayed divided into lead times for each step from ordering until delivery. This consists of: production lead time, referring to the time from receiving orders until the completion of production in the lower level production unit; inventory lead time, referring to the time in which the completed part is stored until it is shipped; and delivery lead time, referring to the time taken for transporting the part from the lower level production unit to the higher level production unit. Alternatively, these lead times can be shown in total. In FIG. 2A, the production lead time, the inventory lead time, and the delivery lead time are each displayed, and their total is also displayed.

The computer 230 of FIG. 2B managed by the first production unit also prepares a database having the same configuration, and the computer 240 of FIG. 2C managed by the second production unit also prepares a database having the same configuration. The part stored in the computer 207 of FIG. 2A managed by the present production unit is stored as a product in the computer 230 for the first production unit of FIG. 2B. The part stored in the computer 230 of FIG. 2B managed by the first production unit is stored as a product in the computer 240 for the second production unit of FIG. 2C.

Databases in the computers 207, 230 and 240 are independently prepared. The linking information to the lower level database is utilized to connect databases from higher level production unit to lower level production unit. Specifically, as shown by 229 in FIGS. 2A and 2B, 233 in FIGS. 2B and 2C, the computer for the lower production unit that produces the adjoining lower level parts becomes a link destination. FIGS. 2A, 2B, and 2C show the following: the linking information 229 links the data in the computer 207 (this computer 207 is provided with the present production unit) concerning the first part B1 that is delivered from Okazaki 2Aa to the present production unit with the database having the product of B1 in the computer 230 (this computer 230 is provided with the production unit of Okazaki 2Aa). Further, the linking information 233 links the data in the computer 230 (this computer 230 is provided with the first production unit) concerning the second part C1 that is delivered from Hamamatsu 1Ba to Okazaki 2Aa with the database having the product of C1 in the computer 240 (this computer 240 is provided with the production unit of Hamamatsu 1Ba).

FIGS. 2A, 2B, and 2C show an example of the database concerning the parts supplies chains that constitute the final product 'A'. The database concerning the parts supplies chains of the first parts that constitute the final product 'A' is within the data base prepared by the present production unit for producing the final product. The linking information to the database concerning the parts supplies chains of the second parts that constitute the firs part is also within the data base prepared by the present production unit for producing the final product. The database concerning the parts supplies chains of the second parts that constitute the first parts is within the data base prepared by the first production unit for producing the first part. The linking information to the database concerning the parts supplies chains of the third parts that constitute the second part is also within the data base prepared by the first production unit for producing the first part. The database concerning the parts supplies chains of the third parts that constitute the second parts is within the data base prepared by the second production unit for producing the second part. The linking information to the database concerning the parts supplies chains of the fourth parts that constitute the third part is also within the data base prepared by the second production unit for producing the second part.

The linked database is edited into one united large-scale database that covers multi-stages database from the lowest level to the highest level. This editing is done by the computer 203 for analyzing the parts supplies chains. The united large-scale database includes product-parts lists of multi-stages in which product-parts (product)-parts (product)-parts (product) information is stored. The linking information is used to assemble product-parts list of single-stage into multi-stages or chains. Corresponding to each of the parts in the product-parts lists of multi-stages, the part supplies information of the part is stored. The parts supplies chains database of multi-stages is thus completed (FIG. 3, S301).

In this manner, by preparing adjoining lower information at each production unit (this information being comparatively easily researched), one united large-scale database that describes the entirety of the parts supplies chains of a large-scale production chains can be prepared. The united large-scale database contains an extensive quantity of information.

The completed parts supplies chains database, which is edited by the computer 203 for analyzing the parts supplies chains, is shown on the output device of the computer 203 or on the output device of the present production unit computer 207 (FIG. 3, S303).

The computer 203 executes retrieval processes on the edited parts supplies chains database. FIG. 3 shows the sequence of display procedure of the result. First, target reference values are determined for each item of parts supplies information. Further a list of standard countermeasures is prepared for each item of parts supplies information. The standard countermeasures are expected to improve the problems that these reference values are not fulfilled. Target reference values and standard countermeasures are then put into the database of the computer 203 for analyzing the parts supplies chains (S305). Next, the parts and the production units that do not fulfill the reference values are retrieved (S307). The name and/or the parts supplies information of the parts that do not fulfill the reference values (which have been obtained from the retrieved results) are highlighted in an output device 205 of the computer 203. Consequently, they can be recognized at a glance. Furthermore, the lists of standard countermeasures are shown together with them. In this manner, problems in the part supplies chains and their countermeasures are shown to the final product production unit. Problems in the parts supplies chains should consequently be rapidly improved.

FIG. 4 is an example displaying the reference values and standard countermeasures in a parts supplies chains database edited by using the linking information. In this case, parts section is schematically shown with a multiple tree structure. Specifically, the columns for B1 (the top lines) reach to the left edge of the parts region. This shows that B1 is the adjoining lower level part of the final product 'A'. This further shows that B1 is produced in two production units: 'Okazaki 2Aa' and 'Okazaki 3Bb'. The columns for C1, which are located below the columns for B1, begin one step further to the right than the columns for B1. This shows that C1 is the adjoining lower level part to B1, and shows that C1 is produced in two production units. In the same way, the columns for D1 begin one step further to the right than the columns for C1 and show that D1 is the adjoining lower level part to C1 and that D1 is produced in two production units.

Reference values 401 may be shown as concrete number enclosed within a cell. The reference number may also be designated by a vertical straight line or the like. For example, as shown by 401, the number of parts has the reference value '2'. Further, the distance of traveling has the reference value '200', and this is also designated by a vertical straight line.

Moreover, a standard countermeasure 403 for each part is displayed when items of parts supplies information do not fulfill the reference values. For example, the same part B1 is produced in two production units and this duplication is indicated by the number '2' in the production units section. The reference value for the duplication is '1'. The standard countermeasure to be required for this case, 'aggregation' is shown. In this case, the letter 'A' represents aggregation. Similarly, the number of parts is indicated by the number '4' and this exceeds its reference value '2'. The standard countermeasure to be required for this case, 'integrate'

(represented by the letter 'B') is shown. The number of types and attribute of the part, 'special purpose part 2' is shown. This exceeds its reference value, which is 'common part 1'. Consequently, the standard countermeasure to be required for this case, 'use common part or general purpose part' (the letter 'C') is shown. Standard countermeasures for fulfilling the reference values are shown in the same way for each further item which does not fulfill the reference values. In the case where the reference values cannot be fulfilled for the logistics information, 'direct delivery' ('D') is shown; for the distance of traveling, 'shorten distance' ('E') is shown; for the defect rate, 'improve quality' ('F') is shown; for the cost, 'reduce number of parts or use general purpose parts' ('G') is shown; for the lead time, 'shorten traveling distance' ('H') is shown, etc. Only a portion of the standard countermeasures are shown in the figure, whereas a plurality of standard countermeasures has been stored.

Most parts fulfill the reference values when the part supplies chains have been well set up, while the items that do not fulfill the reference values are shown clearly in the graphic representation.

As shown in S311 and S313 in FIG. 3, one can modify in various ways the display of the reference values and the standard countermeasures in a graphic display of the parts supplies chains data.

Figure 5:
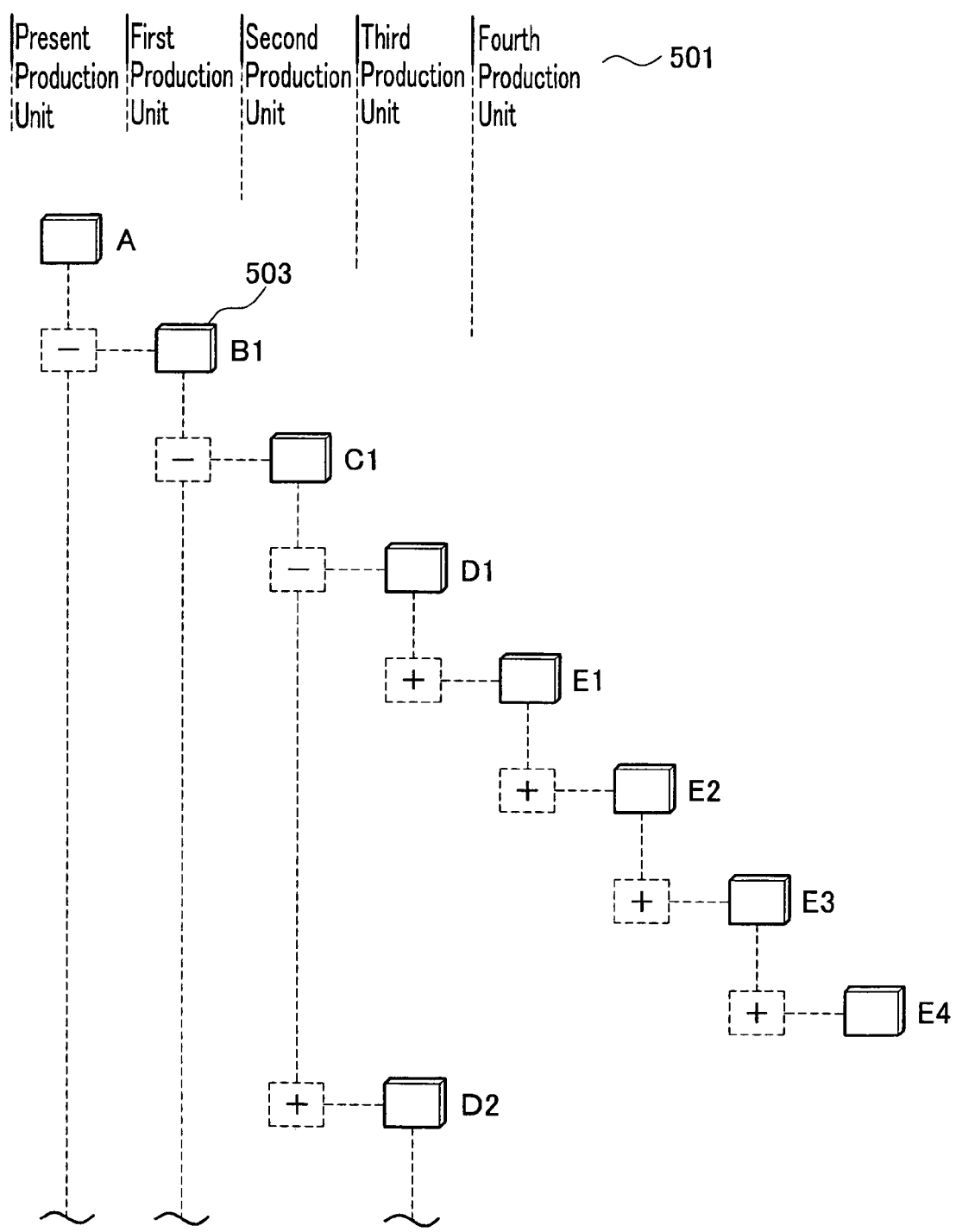
FIG. 5 shows a sample of a display on a user interface in which the product-parts lists of multi-stages stored in the parts supplies chains database is graphically displayed as a hierarchical tree structures, and each part is shown as an icon.
Figure 6:
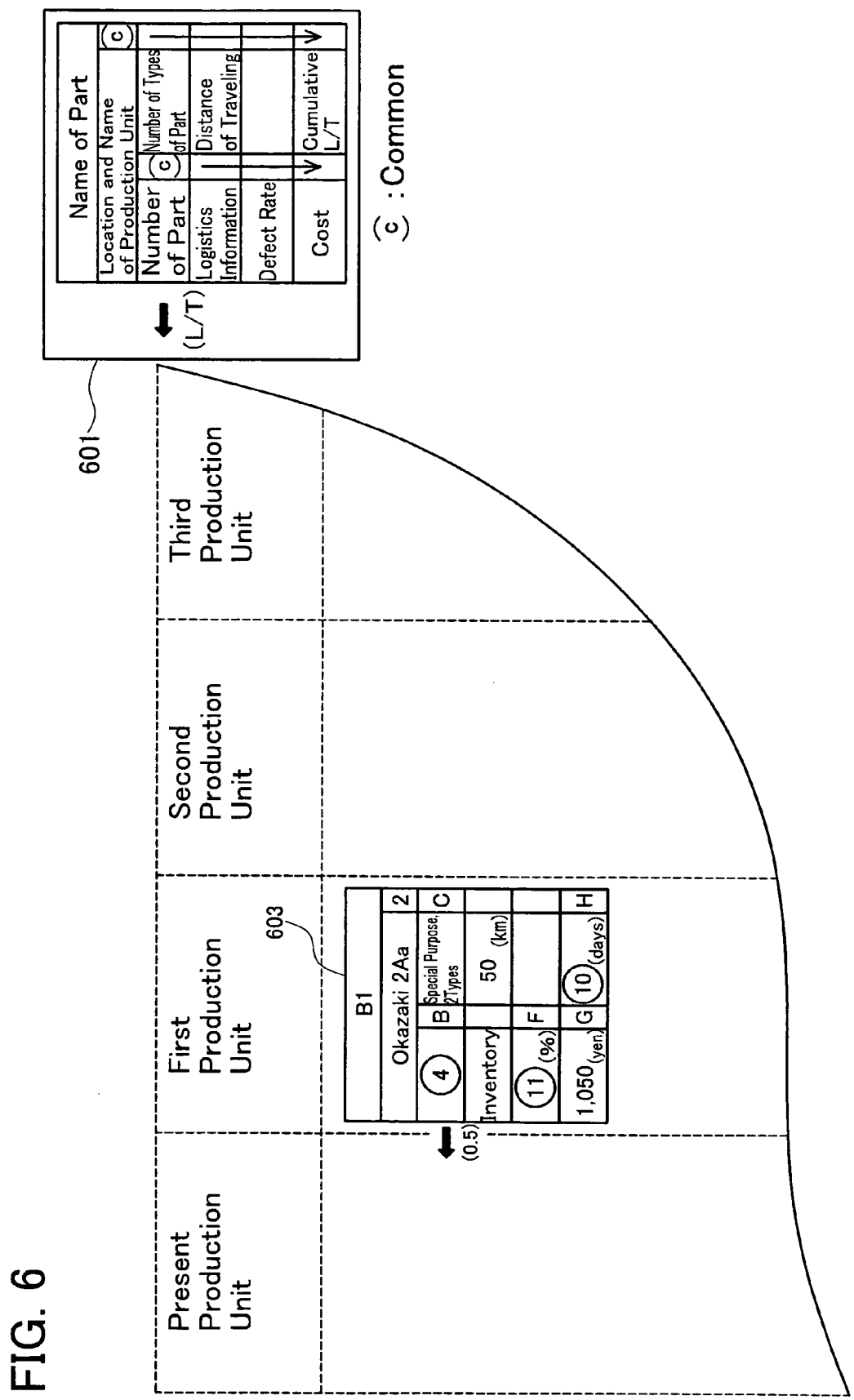
FIG. 6 shows a sample of a display in which parts supply information, reference values, and list of standard countermeasures for each of the parts are shown in one block.

The display listed in S313 in FIG. 3 is shown in FIGS. 5 and 6. In this, the parts and the parts supply information are graphically represented with a hierarchical tree structure.

In FIG. 5, the product-parts lists of multi-stage stored in the parts supplies chains database is displayed with a hierarchical tree structure, each part is shown as an icon and is displayed on a user interface. The section 501 is not shown on the actual user interface, but is mentioned here for convenience so as to aid understanding of the connection between each part and its production unit. For example, if one clicks on the icon 503 for part B1, the parts supply information, the reference values, and the standard countermeasures for the part B1 are shown in one block.

FIG. 6 shows an example displayed in one block. Box 601 explains the meaning of the display in the box 603. As shown in the box 601, the lead time is displayed below the arrow at the left side of the box. This arrow indicates the direction from the current production unit to the adjoining higher level production unit. In the box 603, the number '0.5' below the arrow shows the number of days. 'Name of part' in the box 601 refers to the name of the part: this is displayed as 'B1' in the box 603. Similarly, 'location and name of production unit' in the box 601: this is displayed as 'Okazaki 2Aa' in the box 603, meaning 'production unit a of line A of factory 2 in Okazaki', the production unit for the parts B1. 'Number of parts' in the box 601: this is displayed as the number '4' in the box 603, showing that one higher level part is produced using four parts B1. Moreover, 'Number of types of part' in the box 601: this is displayed as 'special purpose, 2 types' in the box 603, meaning that the parts B1 are special purpose parts, and exist in two types. 'Logistics information' in the box 601: this is displayed as 'inventory' in the box 603, meaning that the parts B1 are delivered from inventory. 'Distance of traveling' in the box 601: this is displayed as '50 km' in the box 603, showing the distance from the production unit of Okazaki 2Aa to the adjoining higher level production unit. 'Defect rate' on one line below in the box 601: this is displayed as '11%' in the box 603, showing the probability of defective parts being produced during the manufacture of the parts B1. 'Cost' on the bottom line in the box 601: this is displayed as '1,050 yen' in the box 603, showing the price of the part B1.

Further, 'cumulative L/T' in the box 601 refers to the cumulative lead time from the lowest lower level production unit to the adjoining lower level production unit, and is displayed as '10 days' in the box 603.

The numbers in the box 603 which are highlighted by being circled are items which do not fulfill the reference values. Moreover, the standard countermeasures (represented by letters of the alphabet) for each item of parts supply information are displayed in the box 603 in the columns corresponding to the countermeasures columns of the box 601.

All information is thus displayed in one block for each of the parts. As a result, it is clear which items are problematic.

Figure 7:
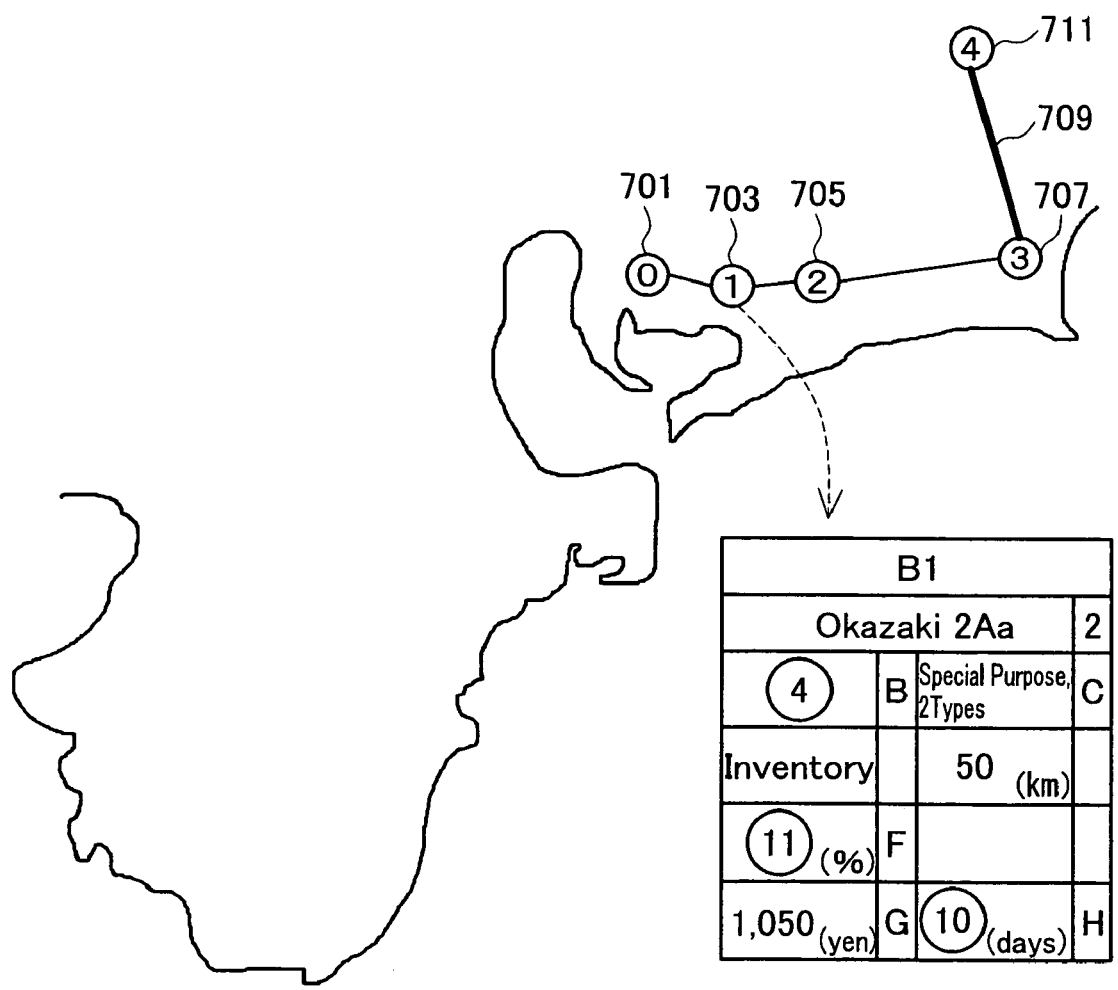
FIG. 7 shows a sample of a display in which parts supply information is graphically displayed on a map at a location where a production unit is located.

FIG. 7 shows another example of display listed in S313 in FIG. 3. Here, the parts supply information is graphically represented on a map indicating a location where the production units are located.

FIG. 7 illustrates the following example. The final products are produced at the present production unit. The first parts B1 are produced at Okazaki 2Aa of the first production unit. The second parts C1 are produced at Hamamatsu 1Ba of the second production unit. The third parts D1 (these parts will be delivered to Hamamatsu 1Ba) are produced at a place 707 of the third production unit. The fourth parts D1 (these parts will be delivered to the place 707) are produced at a place 711 of the fourth production unit. In this case, the location of the present production unit for producing the final product is represented as '0' on the map (meaning that the present production unit is located at a place indicted by 701). Similarly, the location of Okazaki 2Aa is represented as '1' on the map (meaning that the first production unit is located at a place indicted by 703). The location of Hamamatsu 1Ba is represented as '2' on the map (meaning that the second production unit is located at a place indicted by 703). The location of the third production unit is represented as '3' on the map (meaning that the third production unit is located at a place indicted by 707). The location of fourth production unit is represented as '4' on the map (meaning that the fourth production unit is located at a place indicted by 711). Further, a straight line connects adjoining higher level and lower level production units.

Using this display, the location of each of production units is visually defined, as is the linear distance (shown by the straight lines) between the adjoining higher level and lower level production units.

If the traveling distance between the adjoining lower level and higher level production units exceeds the reference values, these section of the straight lines can be highlighted. For example, in FIG. 7, the linear distance between the fourth production unit 711 and the third production unit 707 is highlighted by a thick line (709). Furthermore, clicking on the display of each location 701, 703, 705, 707, and 711 gives a detailed display of the parts supply information for the part produced in each production unit: the display shows whether the reference values are fulfilled or not, and the standard countermeasures for the items that the reference value is not fulfilled. For example, if one clicks on the first production unit 1 (703), the detailed display shown by 713 is given.

FIG. 8 shows another example displayed in S313 in FIG. 3. This is an example showing product-parts lists of multi-stages in a form of hierarchical tree structure. The hierarchical tree structure graphically represented in 801 of FIG. 8 (this has already been shown in FIG. 5) shows a portion of the parts-supplies chains that constitute the final product A The parts B1, C1, D1, D2, E1, E2, E3, and E4 are graphically shown here. The hierarchical tree structure in

801 represents the parts supplies chains before appropriate countermeasures are taken. The hierarchical tree structure in 802 represents the parts supplies chains after appropriate countermeasures are taken for parts in which the reference values had not been fulfilled. In these results, the parts D2, E2, and E3 have been eliminated. In addition, the lower level production units have been reduced to extend no further than the fourth production unit.

The applied countermeasures will now be described. Taking D2 as an example, the reference values have not been fulfilled in a part attribute section. The standard countermeasure 'C' is listed, meaning 'use common parts'. As a result, D2 is changed into a common part with D1 and is integrated with D1. D2 is thus eliminated. In the case of E2 and E3, it was ascertained from information of the part production units that these were produced in the same factory where E1 was produced, but were produced on different lines. As a result, E2 and E3 were installed in E1 in that factory, and E2 and E3 were thus eliminated. In this manner, the number of parts is reduced, and the number of chains of production units from the present production unit to the lowest level production unit is reduced. This allows the lead time to be shortened and the cost of the products to be reduced.

If one compares 801 with 802, thus comparing the state before and after the standard countermeasures were applied, one can see at a glance that the number of parts has been reduced, and hence clearly grasp the effect of applying the countermeasures.

Further, if one clicks on the icon for each part in 802 of FIG. 8, the parts supply information, the reference values, and the standard countermeasures for each of the parts will also be displayed in one block as with the box 603 of FIG. 6. Consequently, if one clicks on the icon for the same part in 801 (before the countermeasures have been applied), one can compare, and learn how each item of the parts supply information has been optimized.

In addition, it is possible to retrieval various production units from the parts supplies chains databases by setting various retrieving criteria. If retrieving criteria are input in S315 of FIG. 3, retrieval process is performed (S317), and the retrieved results are displayed (S319). If for example, the reference values are equal to the retrieving criteria, performing a retrieval process reveals which parts do not fulfill the reference values, as well as related items, and problems become clear immediately.

Using the present invention makes it possible to grasp, from the side of the production unit of the final product, the entirety of the production chains and parts supplies chains: whether there are problems in lower level parts or lower level production units, which parts or production units have the problems, and what countermeasures can be taken to deal with these problems. Further, by applying the countermeasures, following results will be achieved: the amount of lower level parts held in inventory of higher level production unit is kept to a minimum, high quality final products can be produced at a low cost and within a short time, and an efficient production and parts supply chains are attained.

The embodiment described above merely illustrates some possibilities of the invention and does not restrict the claims thereof A person skilled in the art can embody the present invention in various aspects within the art set forth in the claims.

The invention claimed is:

1. A system for assisting findings of problems by revealing the problems existing and concealed in parts supplies chains, wherein parts produced in a production unit are supplied to and used in a subsequent production unit to produce higher level parts, the higher level parts produced in the subsequent production unit are supplied to and used in a further subsequent production unit to produce even higher level parts, and the sequences are repeatedly executed at multiple steps until final parts are produced in a final part production unit and the final parts are supplied to a final product production unit for producing final products, the system comprising:

a means for storing product-parts lists of multi-stages and parts supplies information;

wherein the product-parts lists of multi-stages comprises a final product and a list of adjoining lower level parts constituting the final product (a list of first parts), and the lower level part and a list of even lower level parts constituting the lower level parts (a list of second parts constituting the first part, a list of third parts constituting the second part, etc.), wherein the product-parts lists of multi-stages includes linking information for connecting lists in sequences at multi-stages, and wherein the parts supplies information corresponds to each of the lower level parts included in the product-parts lists of multi-stages, the parts supplies information including at least one item selected out of the traveling distance of the part, the defect rate during the production of the part, the cost of the part, and the lead time of the part, and a means for storing reference vales concerning to parts supplies information, a means for graphically displaying the product-parts lists of multi-stages and the parts supplies information corresponding to each of the parts, wherein the product-parts list includes a production unit of the lower level part listed in the list for each lower level part, and the product-parts list is stored for each production unit wherein the graphic display displays the parts supplies chains and parts and parts supplies information, and wherein the parts supply information are displayed in a different mode depending on whether the reference values have been fulfilled or have not been fulfilled.

2. A system for assisting findings of problems by revealing the problems existing and concealed in parts supplies chains, wherein parts produced in a production unit are supplied to and used in a subsequent production unit to produce higher level parts, the higher level parts produced in the subsequent production unit are supplied to and used in a further subsequent production unit to produce even higher level parts, and the sequences are repeatedly executed at multiple steps until final parts are produced in a final part production unit and the final parts are supplied to a final product production unit for producing final products, the system comprising:

a means for storing product-parts lists of multi-stages and parts supplies information;

wherein the product-parts lists of multi-stages comprises a final product and a list of adjoining lower level parts constituting the final product (a list of first parts), and the lower level part and a list of even lower level parts constituting the lower level parts (a list of second parts constituting the first part, a list of third parts constituting the second part, etc.), wherein the product-parts lists of multi-stages includes linking information for connecting lists in sequences at multi-stages, and wherein the parts supplies information corresponds to each of the lower level parts included in the product-parts lists of multi-stages, the parts supplies information being at least one item selected out of the traveling distance of the part, the defect rate during the production of the part, the cost of the part, and the lead time of the part, and a means for retrieving parts supplies information stored in connection with each part in accordance with retrieving criteria, a means for graphically displaying the product-parts list of multi-stages and the parts supplies information corresponding to each of the parts, wherein the product-parts list includes a production unit of the lower level part listed in the list for each lower level part and the product-parts list is stored for each production unit wherein the graphic display displays the parts supplies chains and parts supplies information, and wherein the part and parts supply information retrieved by the retrieving means are displayed in a different mode than the other.

3. A system as set forth in claim 2, further comprising:
a means for storing reference values concerning each of the items of parts supplies information, and
the aforementioned retrieval means retrieves the parts supply information according to the reference values as the retrieving criteria, and
a means for displaying a list of standard countermeasures for achieving reference values, with respect to the parts supplies information failing to fulfill the reference values and retrieved.

4. A system as set forth in claim 1 or 2, wherein:
a means for storing the product-parts list of single-stage for each production unit stores linking information, the linking information designates the product-parts list of single-stage prepared by another production unit, wherein part in the list is stored as product in the list in the linked storing means.

5. A system as set forth in claim 1 or claim 2, wherein:
each of the lower level parts is displayed on the product-parts lists of multi-stages with its production unit.

6. A system as set forth in claim 1 or claim 2, wherein:
each of the parts is displayed on the product-parts lists of multi-stages with its logistics information from its production unit to the subsequent production unit.

7. A system as set forth in claim 1 or claim 2, wherein:
total lead time of a part from the lowest level part to the adjoining lower level part constituting the part and divided lead times into each part level are displayed separately.

8. A system as set forth in claim 1 or claim 2, wherein:
on the display of product-parts lists of multi-stages, at least one item selected out of the number of the parts required to produce a higher level part, the attribute of the part, and the number of types of the part, whereupon the cost of the part and the lead time of the part are displayed in a manner of comparison.

9. A method for assisting findings of problems by revealing the problems existing and concealed in parts supplies chains, wherein parts produced in a production unit are supplied to and used in a subsequent production unit to produce higher level parts, the higher level parts produced in the subsequent production unit are supplied to and used in a further subsequent production unit to produce even higher level parts, and the sequences are repeatedly executed at multiple steps until final parts are produced in a final part production unit and the final parts are supplied to a final product production unit for producing final products, the method comprising:
a step of preparing a product-parts list of single-stage at each of production units,
a step of preparing linking information to a database prepared by a production unit of producing adjoining lower level part,
a step of preparing parts supplies information corresponding to each of the lower level parts included in the product-parts list, this parts supplies information being at least one item selected out of the traveling distance of the part, the defect rate during the production of the part, the cost of the part, and the lead time of the part, and
a step of storing reference values concerning to parts supplies information,
a step for graphically displaying the product-parts list of multi-stages, parts supplies chains and the parts supplies information corresponding to each of the parts,
wherein in the graphic display, the parts supplies information are displayed in a different mode depending on whether the reference values have been fulfilled or have not been fulfilled.

10. A method for assisting findings of problems by revealing the problems existing and concealed in parts supplies chains, wherein parts produced in one production unit are supplied to and used in a subsequent production unit to produce higher level parts, the higher level parts produced in the subsequent production unit are supplied to and used in a further subsequent production unit to produce even higher level parts, and the sequences are repeatedly executed at multiple steps until final parts are produced in a final part production unit and the final parts are supplied to a final product production unit for producing final products, the method comprising:
a step of preparing a product-parts list of single-stage at each of the production units,
a step of preparing linking information to a database prepared by a production unit of producing adjoining lower level part,
a step of preparing parts supplies information corresponding to each of the lower level parts included in the product-parts list, this parts supplies information being at least one item selected out of the traveling distance of the part, the defect rate during the production of the part, the cost of the part, and the lead time of the part, and
a step of retrieving parts supplies information in accordance with retrieving criteria,
a step for graphically displaying the product-parts list of multi-stages, parts supplies chains, and the parts supplies information corresponding to each of the parts,
wherein in the graphic display, the parts and/or the parts supplies information corresponding to the parts supplies information retrieved are displayed in a different mode than the other.

11. A program for assisting findings of problems revealing the problems existing and concealed in parts supplies chains, wherein parts produced in a production unit are supplied to and used in a subsequent production unit to produce higher level parts, the higher level parts produced in the subsequent production unit are supplied to and used in a further subsequent production unit to produce even higher level parts, and the sequences are repeatedly executed at multiple steps until final parts are produced in a final part production unit and the final parts are supplied to a final product production unit for producing final products, the program operates a computer to execute the steps comprising:
- a step of obtaining data from a database prepared by each of the production units, the database including a product-parts list of single-stage at each of the production units, a linking information to a database prepared by a production unit of producing adjoining lower level part, and parts supplies information corresponding to each of the lower level parts included in the product-parts list, the parts supplies information being at least one item selected out of the traveling distance of the part, the defect rate during the production of the part, the cost of the part, and the lead time of the part, and
- a step of storing reference vales concerning to parts supplies information,
- a step of graphically displaying the product-parts list of multi-stages, parts supplies chains, and the parts supplies information corresponding to each of the parts,
- wherein in the graphic display, the parts supplies information are displayed in a different mode depending on whether the reference values have been fulfilled or have not been fulfilled.

12. A program for assisting findings of problems by revealing the problems existing and concealed in parts supplies chains, wherein parts produced in a production unit are supplied to and used in a subsequent production unit to produce higher level parts, the higher level parts produced in the subsequent production unit are supplied to and used in a further subsequent production unit to produce even higher level parts, and the sequences are repeatedly executed at multiple steps until final parts are produced in a final part production unit and the final parts are supplied to a final product production unit for producing final products, the program operates a computer to execute the steps comprising:
- a step of obtaining data from a database prepared by each of production units, the database including a product-parts list of single-stage at each of production units, a linking information to a database prepared by a production unit of producing adjoining lower level part, and parts supplies information corresponding to each of the lower level parts included in the product-parts list, the parts supplies information being at least one item selected out of the traveling distance of the part, the defect rate during the production of the part, the cost of the part, and the lead time of the part, and
- a step of retrieving parts supplies information in accordance with retrieving criteria,
- a step of graphically displaying the product-parts list of multi-stages, parts supplies chains and the parts supplies information corresponding to each of the parts,
- wherein in the graphic display, the parts/and/or the parts supplies information corresponding to the parts supply information retrieved are displayed in a different mode than the other.

* * * * *

UNITED STATES PATENT AND TRADEMARK OFFICE
CERTIFICATE OF CORRECTION

PATENT NO.      : 7,242,992 B2
APPLICATION NO. : 10/510683
DATED           : July 10, 2007
INVENTOR(S)     : Takahashi et al.

It is certified that error appears in the above-identified patent and that said Letters Patent is hereby corrected as shown below:

On the Title Page, Item (75), in the Inventors, line 2, "Tsubol," should read --Tsuboi,--.

On the Title Page, Item (73), in the Assignee, line 2, "Toyota-Shi, Aichi-Ken" should read --Toyota-shi, Aichi-ken--.

On the Title Page, Item (57), in the Abstract, lines 1-2, "using a large-scale production chains," should read --using large-scale production chains,--.

On the Title Page, Item (57), in the Abstract, line 11, "of production" should read --of: production--.

In claim 1, column 18, line 12, "lists of multi-stages comprises" should read --lists of multi-stages comprise--.

In claim 1, column 18, line 19, "lists of multi-stages includes" should read --lists of multi-stages include--.

In claim 1, column 18, line 29, "vales" should read --values--.

In claim 1, column 18, line 38, after "production unit", insert a comma.

In claim 1, column 18, line 41, "information are displayed" should read --information is displayed--.

In claim 2, column 18, line 58, "lists of multi-stages comprises" should read --lists of multi-stages comprise--.

In claim 2, column 18, line 65, "lists of multi-stages includes" should read --lists of multi-stages include--.

In claim 2, column 19, line 17, after "production unit", insert a comma.

In claim 9, column 20, lines 21-22, "information are displayed" should read --information is displayed--.

In claim 11, column 21, line 14, "vales" should read --values--.

In claim 11, column 21, lines 19-20, "information are displayed" should read --information is displayed--.

UNITED STATES PATENT AND TRADEMARK OFFICE
CERTIFICATE OF CORRECTION

PATENT NO. : 7,242,992 B2
APPLICATION NO. : 10/510683
DATED : July 10, 2007
INVENTOR(S) : Takahashi et al.

It is certified that error appears in the above-identified patent and that said Letters Patent is hereby corrected as shown below:

In claim 12, column 22, line 24, "parts/and/or" should read --parts and/or--.

Signed and Sealed this

Eleventh Day of December, 2007

JON W. DUDAS
*Director of the United States Patent and Trademark Office*